United States Patent
Chan

(10) Patent No.: US 9,533,729 B1
(45) Date of Patent: Jan. 3, 2017

(54) FOLDABLE ELECTRICALLY POWERED VEHICLE

(71) Applicant: Perfect Union Co., Ltd., New Taipei (TW)

(72) Inventor: Ching Chan, New Taipei (TW)

(73) Assignee: PERFECT UNION CO., LTD., New Taipei (TW)

(*) Notice: Subject to any disclaimer, the term of this patent is extended or adjusted under 35 U.S.C. 154(b) by 0 days.

(21) Appl. No.: 15/133,313

(22) Filed: Apr. 20, 2016

(51) Int. Cl.
*B62K 15/00* (2006.01)
*B62K 5/01* (2013.01)
*B62K 21/16* (2006.01)
*B62J 1/08* (2006.01)

(52) U.S. Cl.
CPC ............... *B62K 15/006* (2013.01); *B62J 1/08* (2013.01); *B62K 5/01* (2013.01); *B62K 21/16* (2013.01)

(58) Field of Classification Search
CPC ....... B62K 15/006; B62K 15/001; B62K 5/01; B62K 21/16; B62K 2015/001; B62J 1/08; A61G 5/08; A61G 2005/0808; A61G 2005/0833; A61G 2005/085
See application file for complete search history.

(56) References Cited

U.S. PATENT DOCUMENTS

| | | | | |
|---|---|---|---|---|
| 3,388,761 A * | 6/1968 | Arpin | ..................... | B62D 61/08 180/208 |
| 6,050,593 A * | 4/2000 | McConnell | .............. | B62D 1/14 280/287 |
| 6,176,337 B1 * | 1/2001 | McConnell | .............. | B62D 1/14 180/208 |
| 7,703,567 B2 * | 4/2010 | Wang | ..................... | B62K 5/007 180/208 |
| 7,926,606 B2 * | 4/2011 | Wang | ................... | B62K 15/008 180/208 |
| 8,413,753 B2 * | 4/2013 | Wu | ........................ | B62K 5/007 180/208 |
| 8,684,396 B1 * | 4/2014 | Hanson | .................... | A61G 5/08 280/47.4 |
| 8,776,932 B1 * | 7/2014 | Bussinger | ............ | B62K 15/006 180/208 |
| 9,016,702 B2 * | 4/2015 | Huang | ...................... | B62J 1/08 280/87.041 |
| 9,060,909 B1 * | 6/2015 | Gao | ......................... | A61G 5/08 |
| 9,301,893 B1 * | 4/2016 | Wu | ........................... | A61G 5/08 |
| 2009/0308676 A1 * | 12/2009 | Wang | ..................... | B62K 5/007 180/208 |

(Continued)

*Primary Examiner* — Erez Gurari
(74) *Attorney, Agent, or Firm* — Jackson IPG PLLC; Demian K. Jackson

(57) ABSTRACT

A foldable electric vehicle includes a front frame including two side mounts; a front foot rest including two mounting members and a rear hole; a rear foot rest including two mounting members, a front pivotal board, and a spring biased lock pin locked in the hole; a rear pedestal including two mount elements, two chair supports, and a top hook; hinges for connecting the front frame and the front foot rest, connecting the front foot rest and the rear foot rest, and the rear foot rest and the pedestal; two front links each pivotably secured to the side mount and the mounting member; two rear links each pivotably secured to the mount element and the mounting member; a chair including a transverse rod and a spring biased lock rod locked in the hook; and two sets of two pivotal bars pivotably connected to chair supports and the chair.

5 Claims, 10 Drawing Sheets

(56) References Cited

U.S. PATENT DOCUMENTS

| | | | | |
|---|---|---|---|---|
| 2010/0084831 A1* | 4/2010 | Wang | ........................ | A61G 5/04 |
| | | | | 280/39 |
| 2013/0062846 A1* | 3/2013 | Hsiao | ..................... | B62K 15/00 |
| | | | | 280/87.05 |
| 2015/0137481 A1* | 5/2015 | Manternach | ........... | B62K 5/007 |
| | | | | 280/400 |
| 2015/0209205 A1* | 7/2015 | Ransenberg | ......... | B62K 15/008 |
| | | | | 280/641 |

* cited by examiner

US 9,533,729 B1

FOLDABLE ELECTRICALLY POWERED VEHICLE

BACKGROUND OF THE INVENTION

1. Field of the Invention

The invention relates to electric vehicles and more particularly to a foldable electrically powered vehicle such as personal mobility vehicle having improved characteristics.

2. Description of Related Art

The popularity of personal mobility vehicles (PMVs) has dramatically increased over the last several decades. Although conventional PMVs provide the desired mobility to an operator, they suffered from several disadvantages. Firstly, they were difficult to store during nonuse. In short, they are bulky to be stored in a small room. Secondly, they were difficult to transport in a car also due to bulkiness.

Prior art have attempted to solve the problems of the transportation and storage of a PMV by collapsing or folding same. For example, U.S. Pat. No. 8,720,995 B2 to Wu et al. discloses a foldable seat rack mountable between a body rack and a seat of a foldable motorized vehicle. It includes main supporting rods, upper rods, lower rods, a seat base, hooks, and an elastic element. Main supporting rods are fixed on two sides of the body rack respectively. Upper rods are pivoted on upper ends of the main supporting rods respectively. Lower rods are pivoted on middle portions of main supporting rods and a rear end of seat base respectively. Hooks are fixed on the upper ends of the main supporting rods respectively. The foldable seat base has a middle shaft. Middle portions on two sides of the seat base are opened with slide slots. Two ends of the middle shaft pass through the slide slots freely and are hooked by hooks. An elastic element is placed between the front end of the seat base, and the middle shaft.

However, the '995 patent has disadvantages including the seat rack being not structurally strong, no connection between the chassis plates and the upper rods (or the lower rods), and the folding process being difficult.

Thus, the need for improvement still exists.

SUMMARY OF THE INVENTION

It is therefore one object of the invention to provide a foldable electrically powered vehicle comprising a front frame including a front socket, a stem having a lower end secured to the socket, and two side mounts extending downward; two front wheels rotatably mounted on two sides of a front end of the front frame respectively; a handlebar unit telescopically attached to the stem; a front foot rest including two mounting members extending downward from two sides respectively, and a rear hole; a rear foot rest including two mounting members extending downward from two sides respectively, a front pivotal board, a lock pin under the front pivotal board, and a biasing member biasing against a rear end of the lock pin so that the lock pin is configured to moveably dispose in the rear hole or not; a rear pedestal including two rear wheels rotatably mounted on two sides respectively, two mount elements extending downward from two sides respectively, two chair supports extending upward from two sides respectively, and a top hook; three hinges for connecting the front frame and the front foot rest, connecting the front foot rest and the rear foot rest, and the rear foot rest and the pedestal respectively; two front links each having two ends pivotably secured to the side mount and the mounting member respectively; two rear links each having two ends pivotably secured to the mount element and the mounting member respectively; a chair including a bottom frame secured to the chair supports, a transverse rod in the bottom frame, a moveable lock rod operatively connected to the transverse rod, and a biasing element put on an intermediate portion of the lock rod, the lock rod having a front end inserted into the hook to lock the chair in an unfolded position of the chair; and two sets of two pivotal bars wherein each pivotal bar of each set has a first end pivotably connected to either chair support and a second end pivotably connected to the bottom frame respectively; wherein a lifting of the front pivotal board causes the lock pin to clear the rear hole by moving rearward with the biasing member being compressed; wherein a pulling of the transverse rod causes the lock rod to clear the top hook by moving rearward with the biasing element being compressed; and wherein a rotation of the front frame, the front foot rest, and the rear foot rest about the hinges, and a rotation of the chair about the chair supports dispose them in folded positions proximate the chair supports.

The above and other objects, features and advantages of the invention will become apparent from the following detailed description taken with the accompanying drawings.

DETAILED DESCRIPTION OF THE INVENTION

Figure 1:
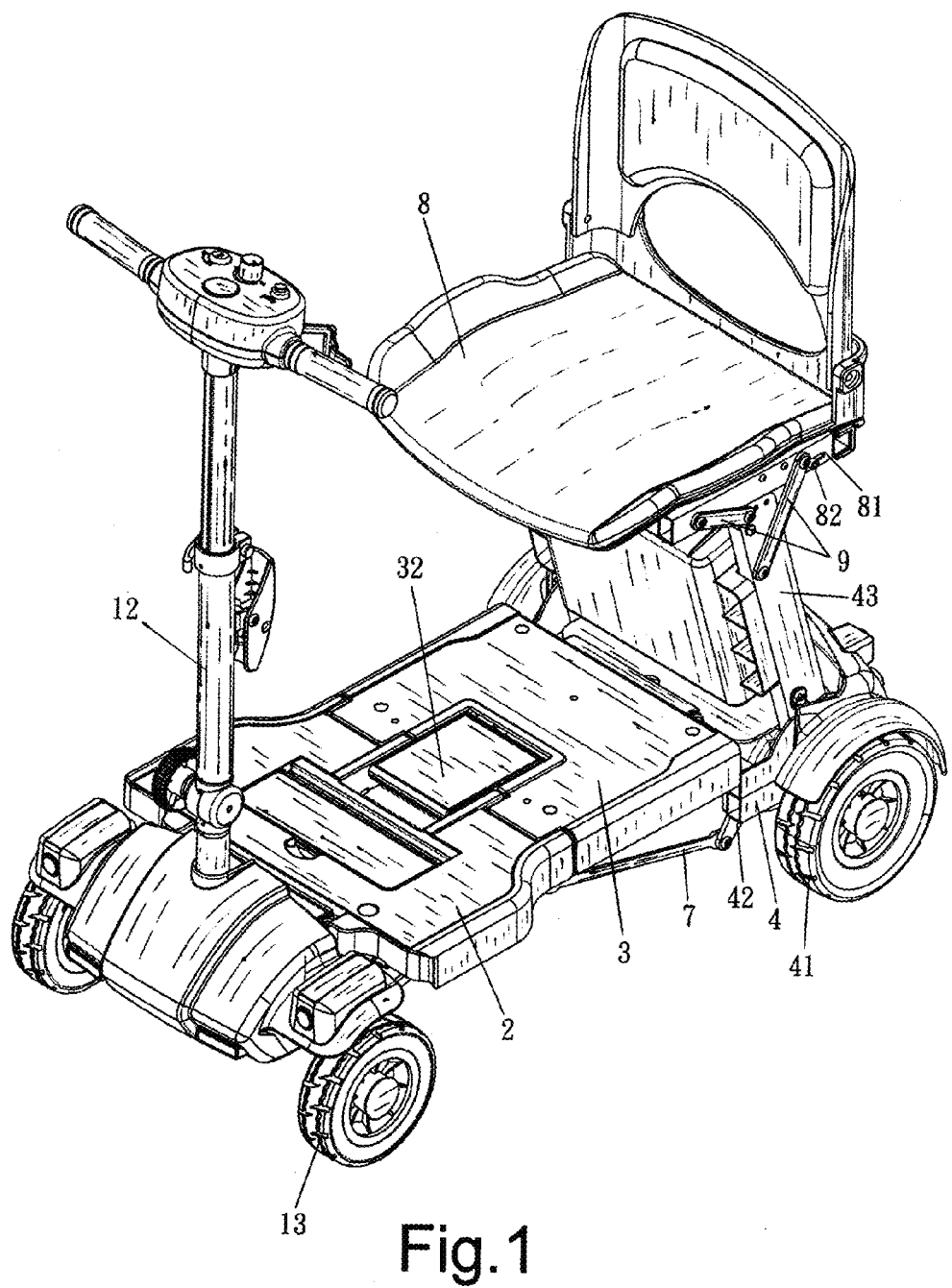
FIG. 1 is a perspective view of a foldable personal mobility vehicle according to the invention.
Figure 2:
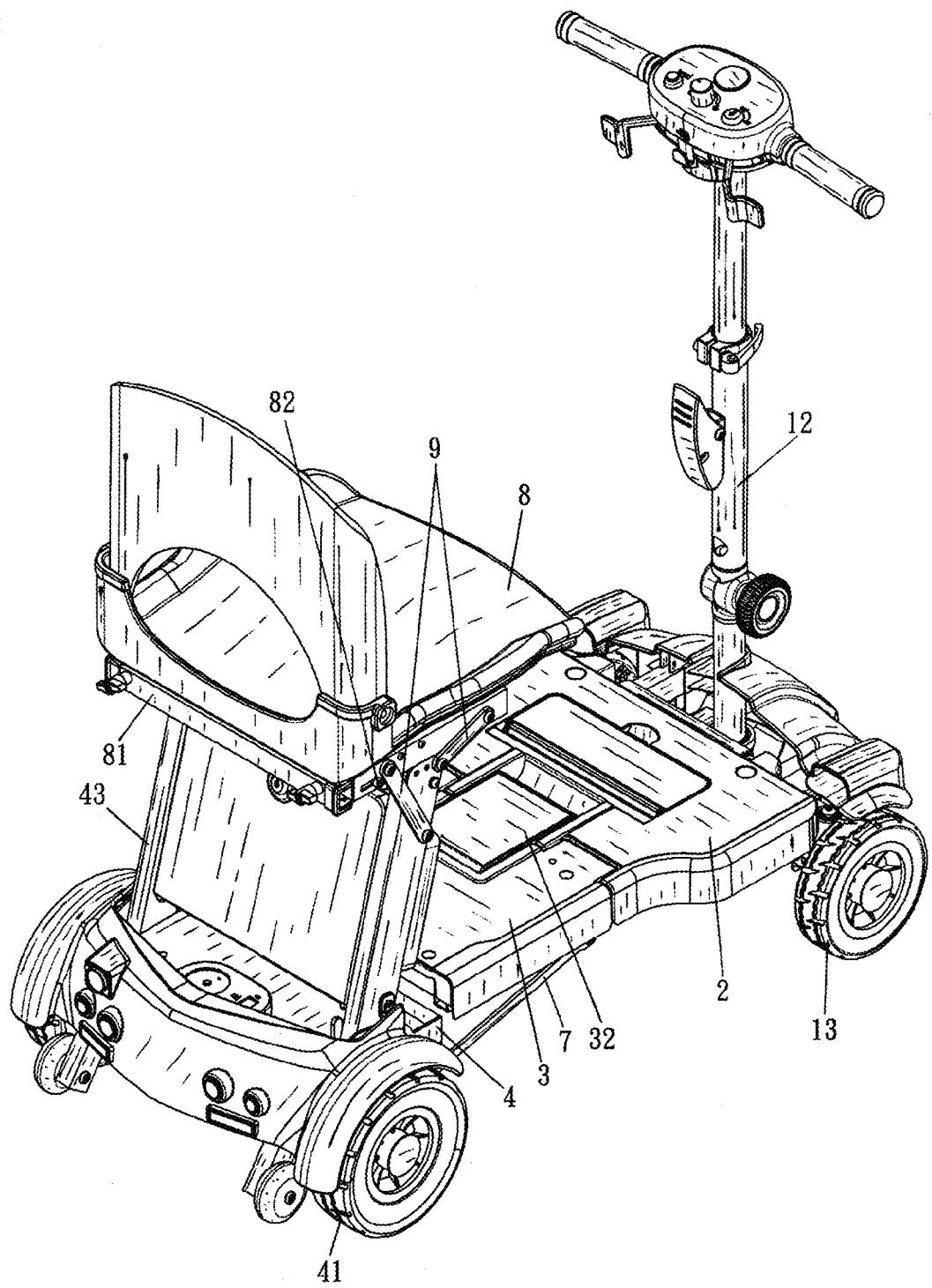
FIG. 2 is another perspective view of the foldable personal mobility vehicle.
Figure 3:
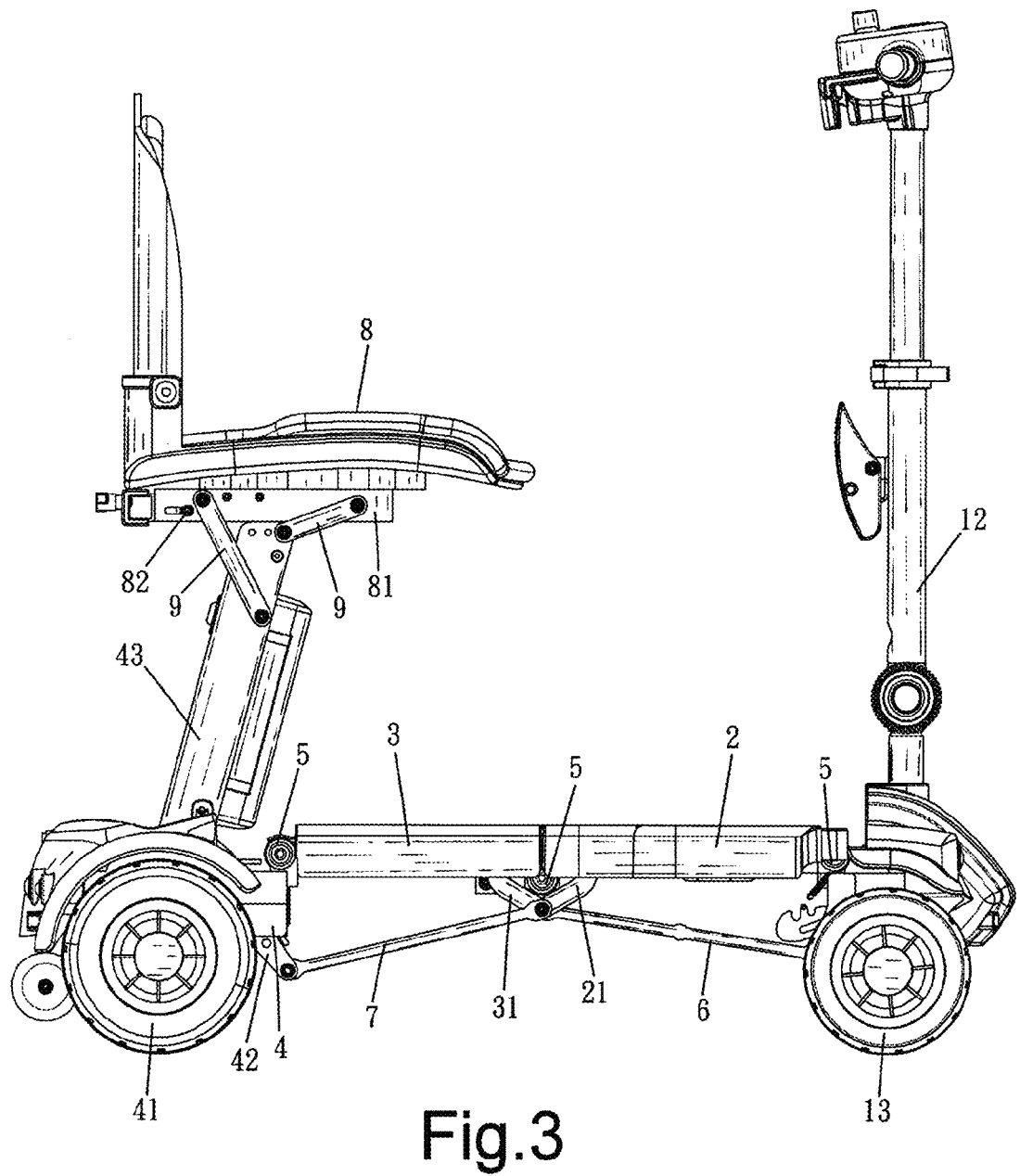
FIG. 3 is a side view of the foldable personal mobility vehicle.
Figure 4:
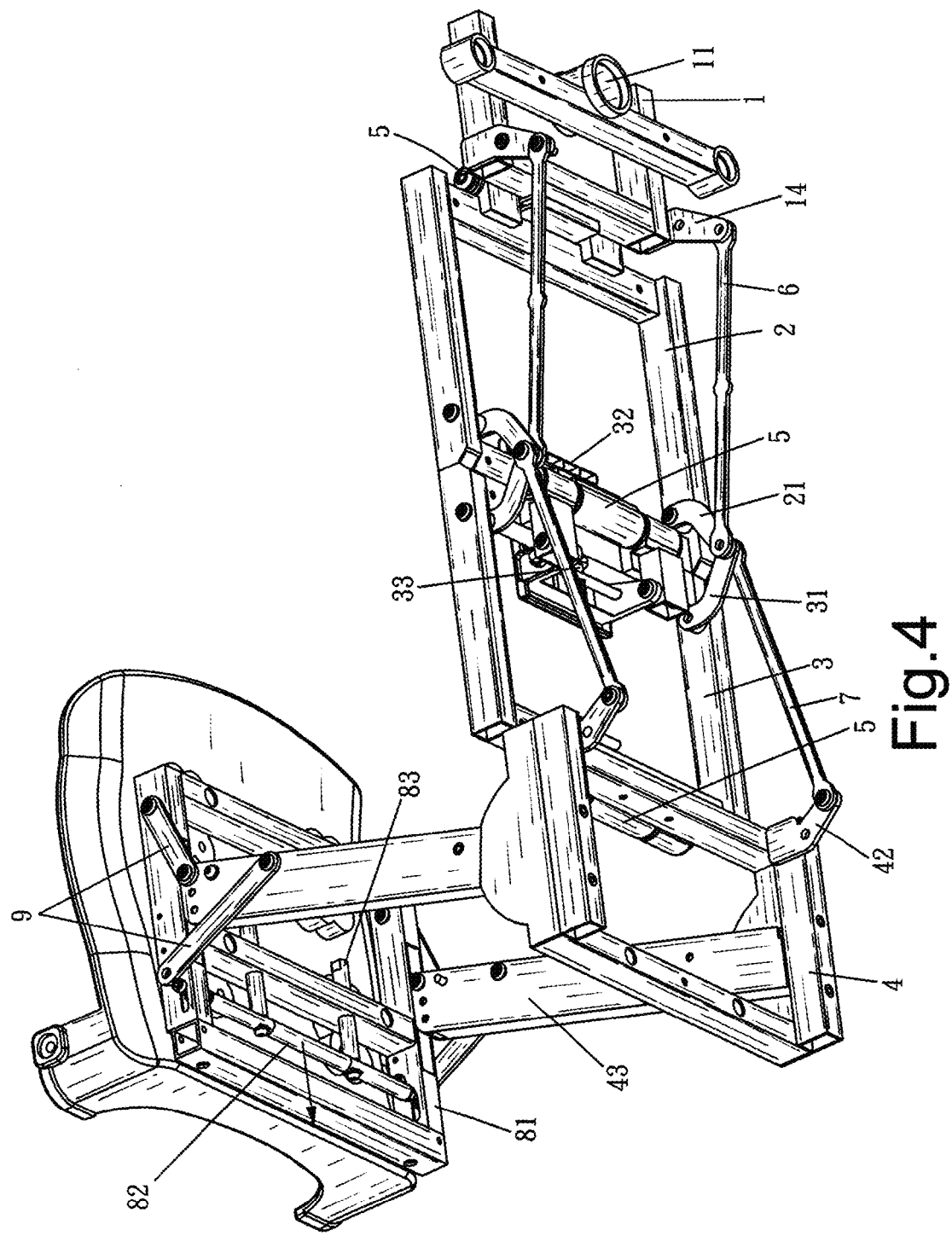
FIG. 4 is a perspective view of the chair frame and the chassis of the foldable personal mobility vehicle.
Figure 5:
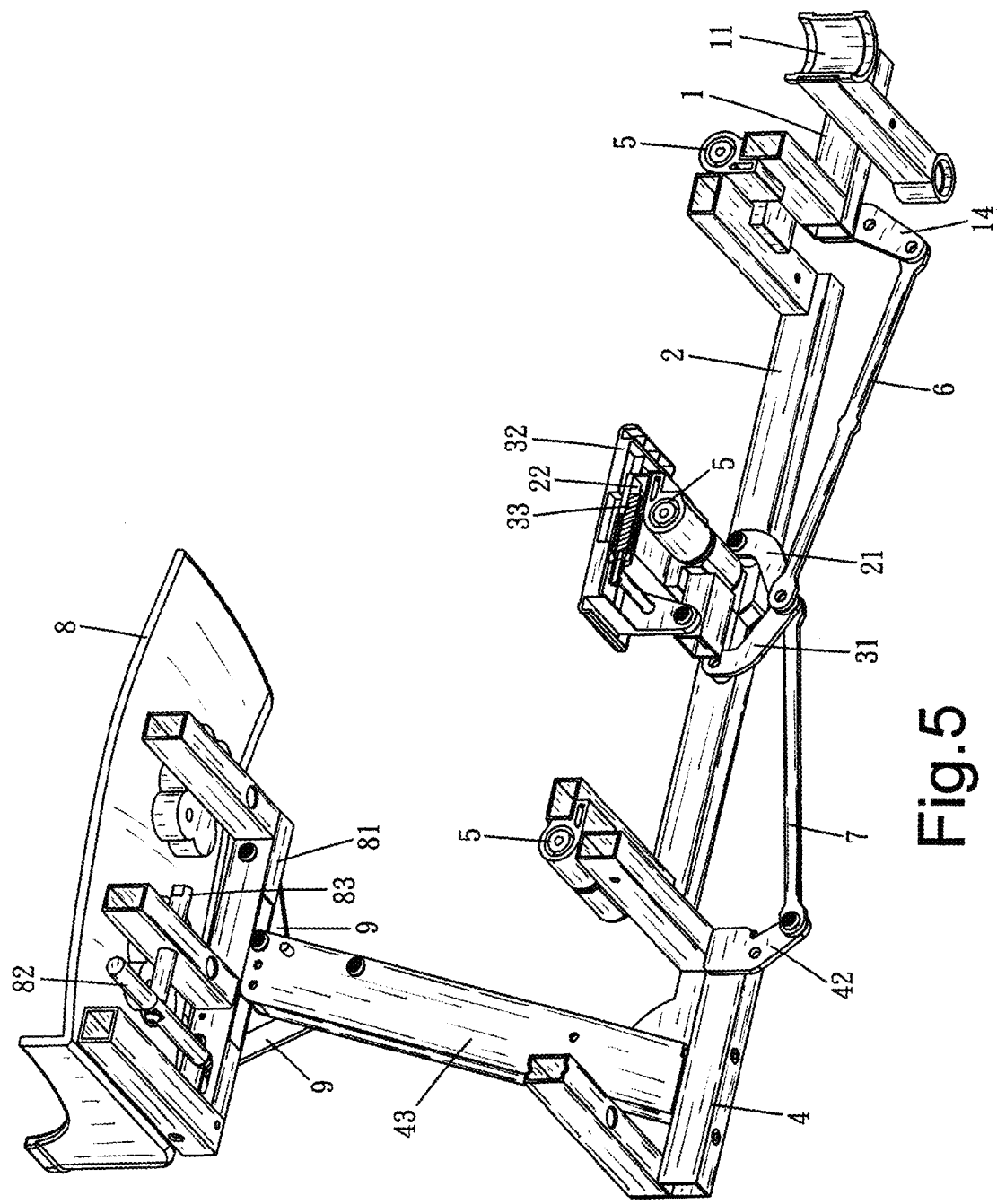
FIG. 5 is a broken-away perspective view of FIG. 4.
Figure 6:
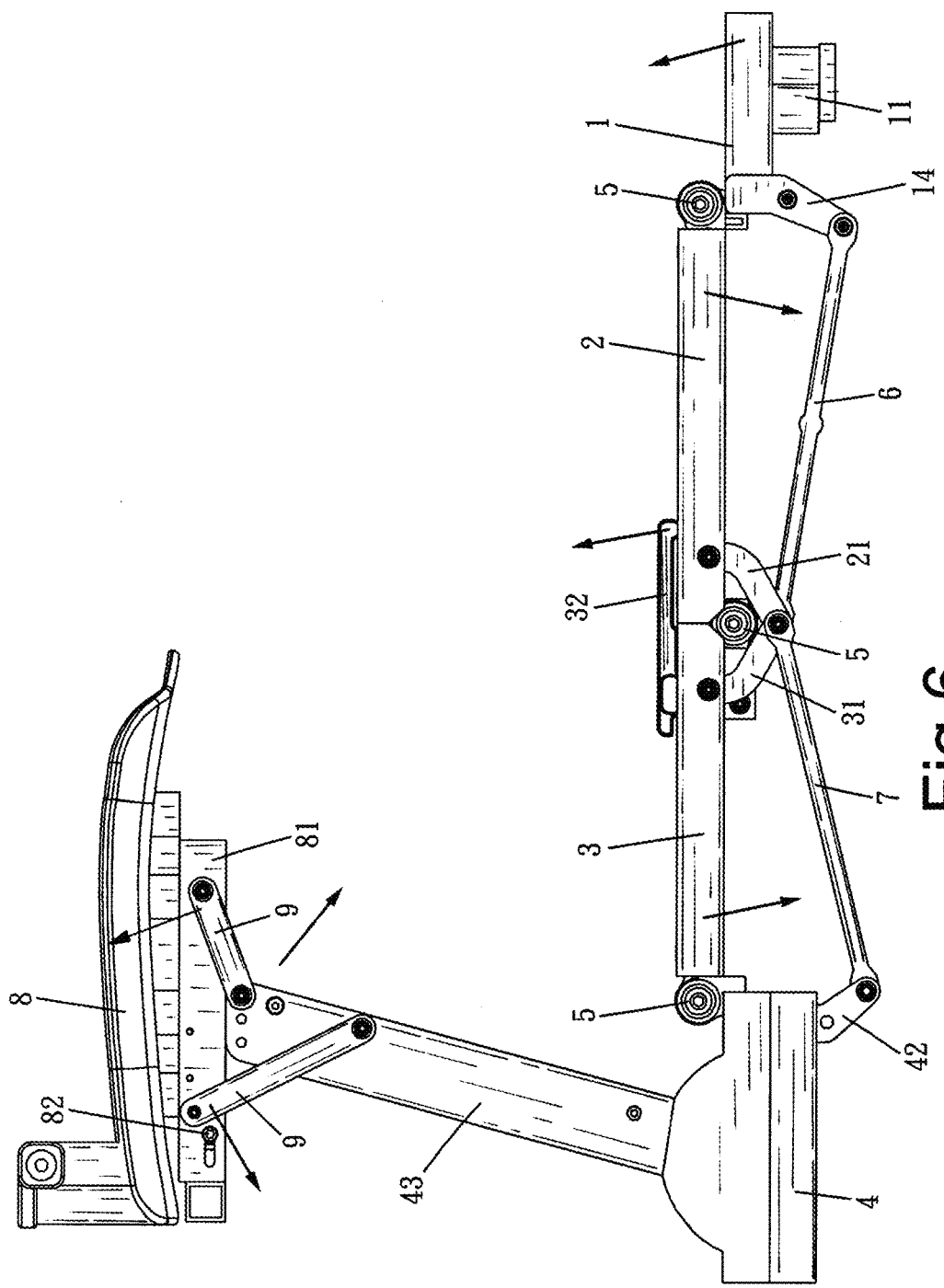
FIG. 6 is a side view of FIG. 4.
Figure 7:
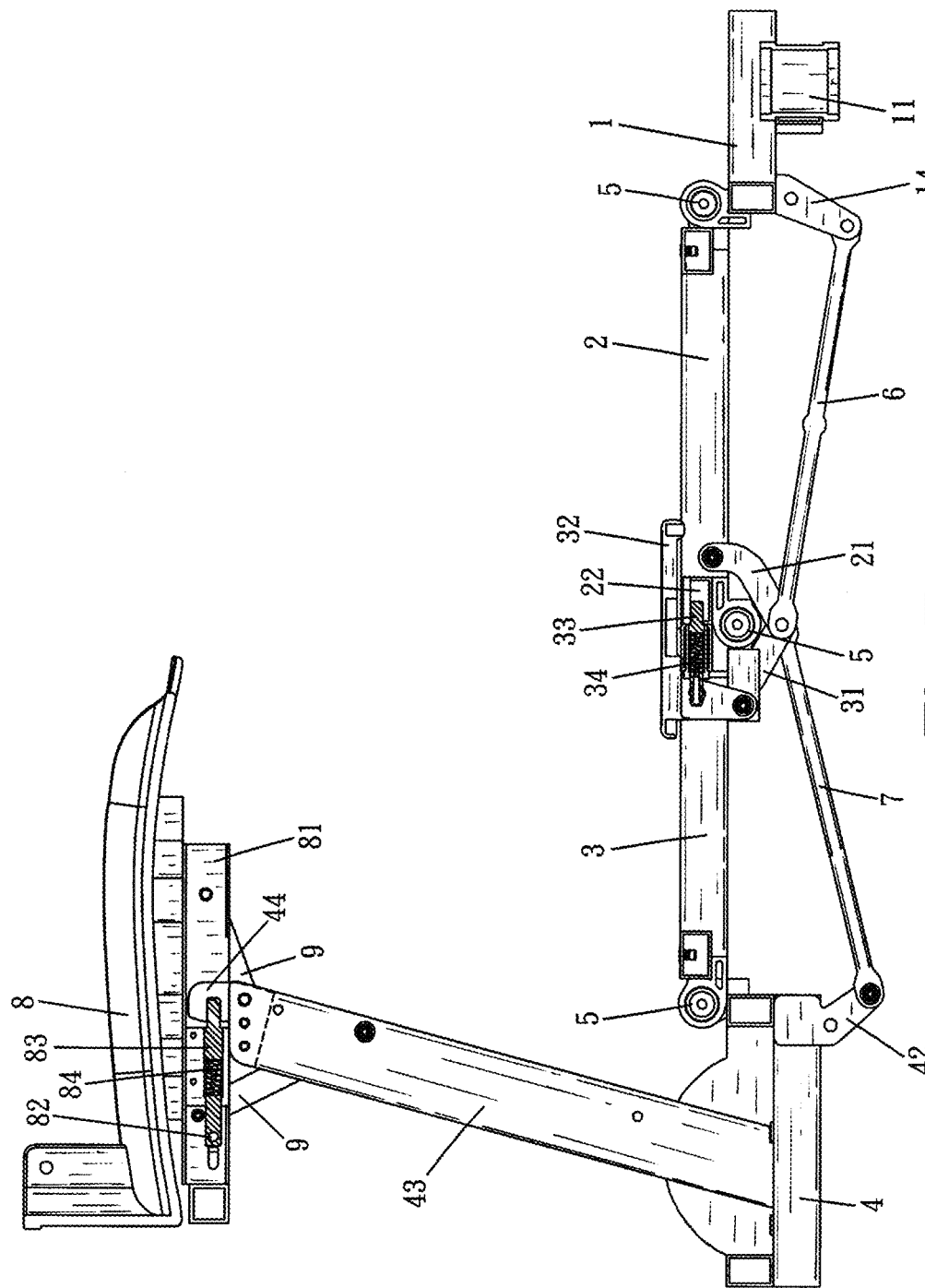
FIG. 7 is a view similar to FIG. 6 in part section where the chair and the chassis are locked.
Figure 8:
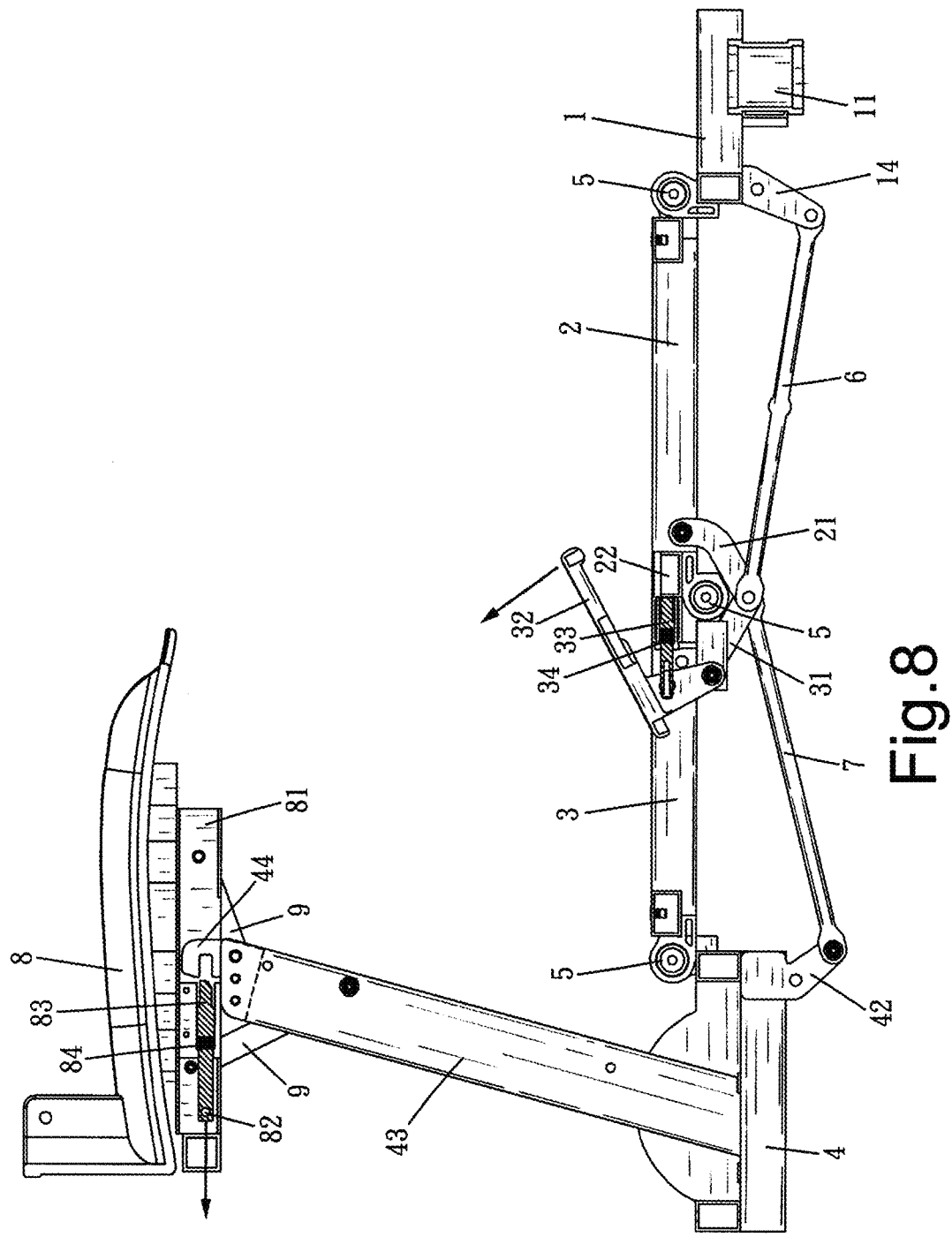
FIG. 8 is a view similar to FIG. 7 where the chair is unlocked by pulling the transverse rod and the chassis is unlocked by lifting the pivotal board.
Figure 9:
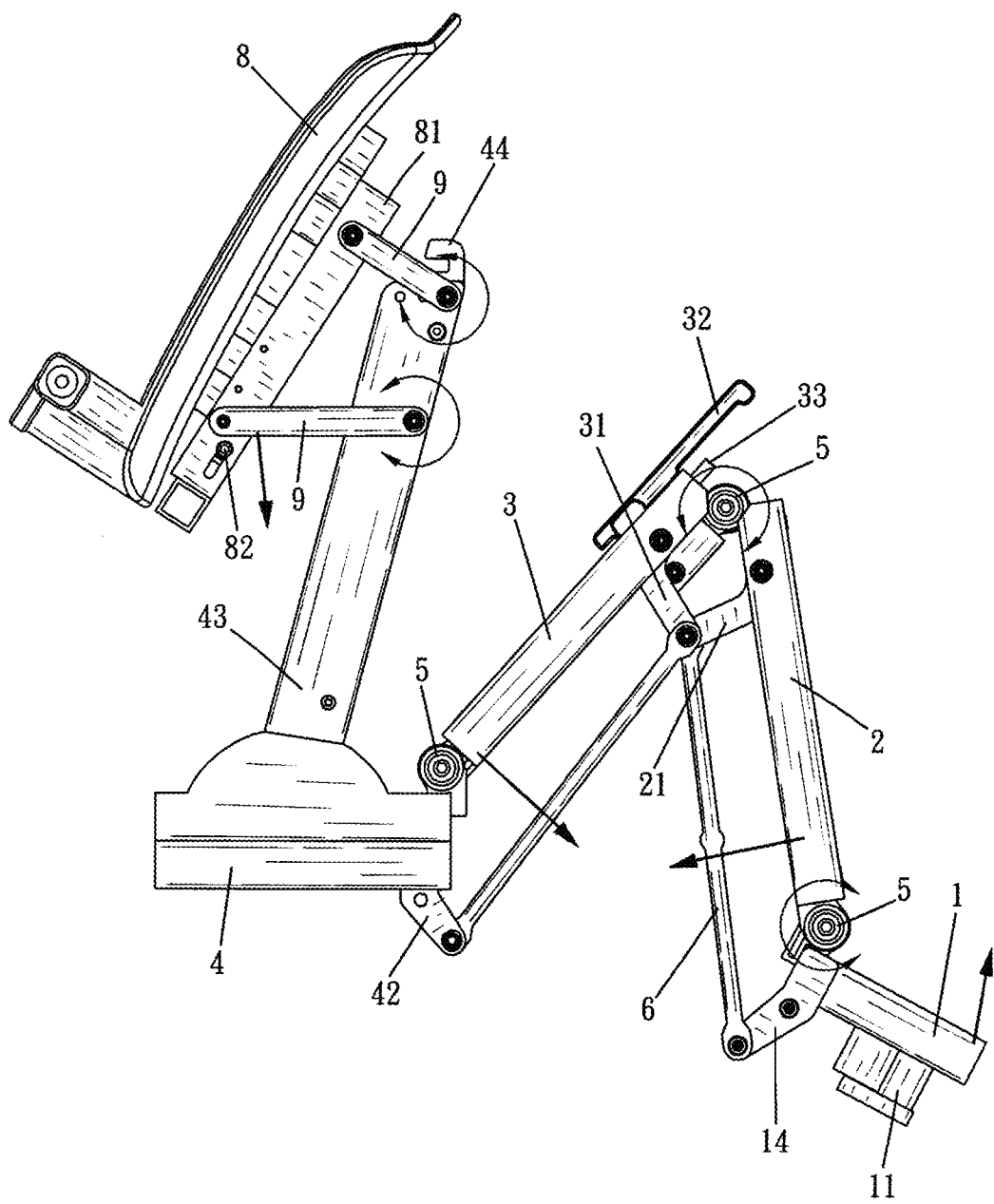
FIG. 9 is a view similar to FIG. 8 showing the chair and the chassis being folded during the folding process.

Referring to FIGS. 1 to 10, a foldable personal mobility vehicle (PMV) in accordance with the invention comprises the following components as discussed in detail below.

A front frame 1 includes a front socket 11, a stem 12 having a lower end secured to the socket 11, two side mounts 14 extending downward, two front wheels 13 rotatably mounted on two sides of a front end respectively, and a handlebar unit 15 telescopically attached to the stem 12. A front foot rest 2 includes two mounting members 21 extending downward from two sides respectively, and a hole 22 in a rear end. A rear foot rest 3 includes two mounting members 31 extending downward from two sides respectively, a pivotal board 32 in a front end, a lock pin 33 under the pivotal board 32, and a torsion spring 34 biasing against a rear end of the lock pin 33 so that the lock pin 33 may moveably dispose in the hole 22 or not.

A rear pedestal 4 includes two rear wheels 41 rotatably mounted on two sides respectively, two mount elements 42 extending downward from two sides respectively, two chair supports 43 inclined upward from two sides respectively, and a hook 44 on a top. Three hinges 5 for connecting the front frame 1 and the front foot rest 2, connecting the front foot rest 2 and the rear foot rest 3, and the rear foot rest 3 and the pedestal 4 respectively. Specifically, the intermediate hinge 5 connects a bottom corner of a rear end of the front foot rest 2 and a bottom corner of a front end of the rear foot rest 3. Two front links 6 each have two ends pivotably secured to the side mount 14 and the mounting member 31 respectively. Two rear links 7 each have two ends pivotably secured to the mount element 42 and the mounting member 21 respectively.

A chair 8 includes a bottom frame 81 secured to the chair supports 43, a transverse rod 82 in the bottom frame 81, a moveable lock rod 83 operatively connected to a center of the transverse rod 82, and a torsion spring 84 put on an intermediate portion of the lock rod 83. The lock rod 83 has a front end inserted into the hook 44 to lock the chair 8 in an unfolded position of the chair 8 due to expansion of the spring 84. Two sets of two pivotal bars 9 are provided. Each pivotal bar 9 of each set has a first end pivotably connected to the chair support 43 and a second end pivotably connected to the bottom frame 81 respectively.

Figure 10:
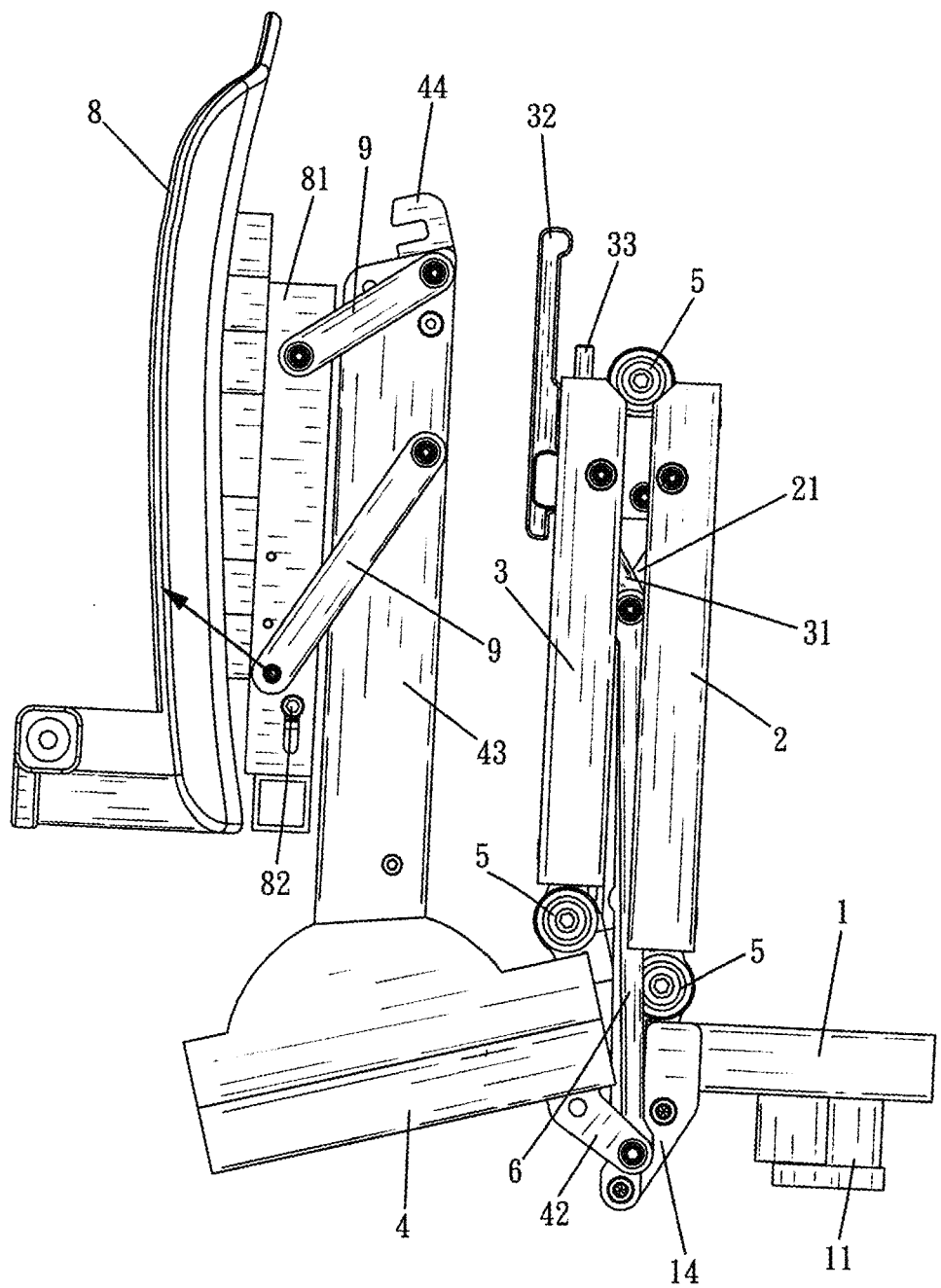
FIG. 10 is a view similar to FIG. 9 showing the chair and the chassis having been folded.

Folding operation of the invention is discussed in detailed below by referring to FIGS. 7 to 10 specifically. An individual may pivotably lift the pivotal board 32 (as indicated by one arrow of FIG. 8) so that the lock pin 33 may clear the hole 22 by moving rearward to compress the spring 34. Further, the individual may pull the transverse rod 81 (as indicated by the other arrow of FIG. 8) so that the lock rod 83 may clear the hook 44 by moving rearward with the spring 84 being compressed. Thereafter, the individual rotate the front frame 1, the front foot rest 2, and the rear foot rest 3 about the hinges 5, and rotate the chair 8 about the chair supports (43) in directions as indicated by arrows of FIG. 9 respectively. As a result, the front frame 1, the front foot rest 2, the rear foot rest 3, and the chair 8 are folded in positions proximate the chair supports 43 as indicated by FIG. 10.

While the invention has been described in terms of preferred embodiments, those skilled in the art will recognize that the invention can be practiced with modifications within the spirit and scope of the appended claims.

What is claimed is:

1. A foldable electrically powered vehicle comprising:
   a front frame (1) including a front socket (11), a stem (12) having a lower end secured to the socket (11), and two side mounts (14) extending downward;
   two front wheels (13) rotatably mounted on two sides of a front end of the front frame (1) respectively;
   a handlebar unit (15) telescopically attached to the stem (12);
   a front foot rest (2) including two mounting members (21) extending downward from two sides respectively, and a rear hole (22);
   a rear foot rest (3) including two mounting members (31) extending downward from two sides respectively, a front pivotal board (32), a lock pin (33) under the front pivotal board (32), and a biasing member (34) biasing against a rear end of the lock pin (33);
   a rear pedestal (4) including two rear wheels (41) rotatably mounted on two sides respectively, two mount elements (42) extending downward from two sides respectively, two chair supports (43) extending upward from two sides respectively, and a top hook (44);
   three hinges (5) for connecting the front frame (1) and the front foot rest (2), connecting the front foot rest (2) and the rear foot rest (3), and the rear foot rest (3) and the pedestal (4) respectively;
   two front links (6) each having two ends pivotably secured to the side mount (14) and the mounting member (31) respectively;
   two rear links (7) each having two ends pivotably secured to the mount element (42) and the mounting member (21) respectively;
   a chair (8) including a bottom frame (81) secured to the chair supports (43), a transverse rod (82) in the bottom frame (81), a moveable lock rod (83) operatively connected to the transverse rod (82), and a biasing element (84) put on an intermediate portion of the lock rod (83), the lock rod (83) having a front end inserted into the top hook (44) to lock the chair (8) in a locked position; and
   two sets of two pivotal bars (9) wherein each pivotal bar (9) of each set has a first end pivotably connected to either chair support (43) and a second end pivotably connected to the bottom frame (81) respectively;
   wherein a lifting of the front pivotal board (32) causes the lock pin (33) to clear the rear hole (22) by moving rearward with the biasing member (34) being compressed;
   wherein a pulling of the transverse rod (81) causes the lock rod (83) to clear the top hook (44) by moving rearward with the biasing element (84) being compressed; and
   wherein a rotation of the front frame (1), the front foot rest (2), and the rear foot rest (3) about the hinges (5), and a rotation of the chair (8) about the chair supports (43) dispose them in folded positions proximate the chair supports (43).

2. The foldable electrically powered vehicle of claim 1, wherein in a locked position the biasing member (34) biases against a rear end of the lock pin (33) so that the lock pin (33) is configured to moveably dispose in the rear hole (22) or not.

3. The foldable electrically powered vehicle of claim 1, wherein a bottom of the bottom frame (81) is fastened at tops of the chair supports (43).

4. The foldable electrically powered vehicle of claim 1, wherein the lock rod (83) has the front end inserted into the top hook (44) to lock the chair (8) in the locked position.

5. The foldable electrically powered vehicle of claim 1, wherein one of the hinges (5) is configured to connect a bottom corner of a rear end of the front foot rest (2) and a bottom corner of a front end of the rear foot rest (3).

* * * * *